(12) United States Patent
Kurz

(10) Patent No.: US 6,465,749 B1
(45) Date of Patent: Oct. 15, 2002

(54) MAGNETOSTRICTIVE MASS SENSING APPARATUS AND METHOD

(75) Inventor: Jerome Leigh Kurz, Carmel Valley, CA (US)

(73) Assignee: Los Robles Advertising, Inc., Monterey, CA (US)

( * ) Notice: Subject to any disclaimer, the term of this patent is extended or adjusted under 35 U.S.C. 154(b) by 0 days.

(21) Appl. No.: 09/612,046

(22) Filed: Jul. 7, 2000

(51) Int. Cl.[7] .......................... G01G 3/16; G01G 11/04
(52) U.S. Cl. .................................. 177/210 FP; 73/580
(58) Field of Search ................ 177/210 FP; 73/580, 73/24.03, 61.72, 61.75; 324/633, 634, 635

(56) References Cited

U.S. PATENT DOCUMENTS

| | | | | |
|---|---|---|---|---|
| 3,566,678 A | * | 3/1971 | Christmann | 177/210 FP |
| 3,583,209 A | | 6/1971 | Banks | 73/32 |
| 3,744,297 A | | 7/1973 | Hanson et al. | 73/28 |
| 3,926,271 A | | 12/1975 | Patashnick | 177/210 |
| 4,158,395 A | | 6/1979 | Brown | 177/210 FP |
| 4,391,338 A | | 7/1983 | Patashnick et al. | 177/210 FP |
| 4,568,520 A | | 2/1986 | Ackermann et al. | 422/66 |
| 4,696,181 A | | 9/1987 | Rupprecht et al. | 73/580 |
| 4,836,314 A | | 6/1989 | Rupprecht et al. | 177/210 FP |
| 4,838,371 A | | 6/1989 | Rupprecht et al. | 177/210 FP |
| 4,937,005 A | * | 6/1990 | Shelstad | 210/785 |
| 5,110,747 A | | 5/1992 | Pataschnick et al. | 436/133 |
| 5,196,170 A | | 3/1993 | Patashnick et al. | 422/83 |
| 5,261,274 A | * | 11/1993 | Nemirow | 73/149 |
| 5,349,844 A | | 9/1994 | Lilienfeld | 73/28.01 |
| 5,402,670 A | * | 4/1995 | Wicnienski | 177/210 FP |
| 5,488,203 A | | 1/1996 | Hassel et al. | 177/184 |
| 5,528,933 A | * | 6/1996 | Nemirow | 73/149 |
| 5,684,276 A | * | 11/1997 | Altemir | 73/580 |
| 5,717,147 A | | 2/1998 | Basch et al. | 73/863.23 |
| 5,769,539 A | * | 6/1998 | Tsang et al. | 374/16 |
| 5,970,781 A | | 10/1999 | Hiss, III et al. | 73/28.01 |
| 6,164,140 A | * | 12/2000 | Kalinoski | 73/861.357 |

FOREIGN PATENT DOCUMENTS

| | | | | |
|---|---|---|---|---|
| JP | 52042143 | * | 4/1977 | 177/210 FP |

* cited by examiner

*Primary Examiner*—Randy W. Gibson
(74) *Attorney, Agent, or Firm*—Robert M. Gamson; Leonard Bloom

(57) ABSTRACT

An apparatus and method for weighing particulates in a gas stream has a generally cylindrical tube manufactured from a magnetostrictive material. One end of the tube is anchored to a mounting block, while the other end includes a filter. The gas stream passes through a filter, where particulates are collected. Several alternative filters provide various alternative benefits for varying applications to different sensing applications. Between the two ends of the magnetostrictive tube are electromagnetic drive and pick-up coils which are magnetically coupled to the tube. The drive coils are driven by an electrical current from an electronic control circuit to generate alternating magnetic fields. These alternating fields in turn stimulate ultrasonic oscillations in the magnetostrictive tube, causing the tube to extend and retract along the length. Oscillation is in the longitudinal direction only, resulting in only one mode of operation. The frequency of oscillation of the magnetostrictive tube is monitored by the pick-up coils, and this data is returned to the electronic control circuit. The frequency of oscillation varies directly in proportion to the mass of collected particulates, and so the mass is readily is calculated by the electronic control circuit and output as data for a user. The magnetostrictive material is not only chemically resistant, but also quite temperature, vibration and impact resistant, permitting use in a broad range of applications, some which were not previously possible to be sensed. A method of sensing is also disclosed.

20 Claims, 3 Drawing Sheets

MAGNETOSTRICTIVE MASS SENSING APPARATUS AND METHOD

BACKGROUND OF THE INVENTION

1. Field of the Invention

This invention pertains generally to weighing scales. More specifically, the present invention incorporates a filter in a gas stream for separating particles therefrom, and a magnetostrictive oscillating tube supporting the filter. A change of resonant frequency within the oscillating tube is used to electronically measure the mass of particles separated from the gas stream.

2. Description of the Related Art

Accompanying the operation of many machines and devices is the production of by-products. These by-products in many cases are undesirable, and in some cases will require monitoring for various process control or legally mandated reporting purposes. For example, during the operation of a diesel engine, one undesirable side-effect of rapid speed or load changes upon the engine is the production of a large quantity of carbon particulates, commonly referred to in aggregate as soot, which comes from the incomplete combustion of the diesel fuel mixture within the engine cylinders. This generation of soot is undesirable, and may be prevented using modem engine control circuitry if detected by a sensor and conveyed to an engine electronic control unit (ECU). Similarly, the proper operation of scrubbers in the smokestack or exhaust stream of a power plant, garbage incinerator, concrete plant, paper or pulp processing plant and the like may be monitored by measuring the particular content after treatment by the scrubbers. In the event of a malfunction or decreased efficacy of a scrubber, the monitor can be used to signal the need for service. Hazardous materials clean-up projects, including radioactive or contaminated materials and asbestos, will also require monitoring to ensure the hazardous materials are not displaced excessively through the air. Furthermore, in any environment where humans must exist, and more frequently co-exist with machines, there is the potential need for monitoring air for particulates.

Frequently complicating the need for adequate monitoring are factors which are dependent upon the site and the nature of the particulate to be monitored. One factor, for example in the case of a smoke stack, is the presence of large amounts of water vapor that are prone to condensation or adsorption. Any condensed or adsorbed water may be misinterpreted as additional particulate contamination, and so the sensor will most desirably be insensitive to water vapor contained within the gas or gas stream being monitored. A second factor complicating monitoring is the need for frequent or continuous sampling. Most preferably, a sensor may be placed within a smokestack or at a site and be left unattended for a predetermined period. During the unattended period, it would be most desirable for the sensor to continuously, or intermittently at predetermined times or time intervals, monitor the gas stream and record or store the results of the sensing. With the desire for automated monitoring comes the need for the sensor to operate through multiple measurement cycles without the need for repeated recalibration. A third factor complicating monitoring is the very small size and mass of contaminant particulates. In order to be air-borne, the particulates will typically be of very minute size and low mass. Sensitivity of the measuring device is very important, as is the actual retention of particulates within the measuring region. The potentially diverse size of the particulates can further complicate this retention, since different sized particles will typically be collected and retained differently strictly depending upon actual size. Another factor complicating monitoring is the industrial nature of many of the environments where the sensor will have application. During the operation of a diesel-fueled vehicle, there will typically be a large number of relatively low-frequency impacts or shocks that are unavoidably transmitted to the sensor. These shocks have been known in the prior art to overwhelm the sensor, resulting in inaccurate data generation. Furthermore, when the shocks are substantial enough, the very integrity of the sensor may be jeopardized. Finally, the industrial environment is prone to large electromagnetic pulses, which can disrupt sensitive electronic circuitry.

Monitoring of particulates has in the prior art most frequently taken the form of one or more commercial sensors, including: opacity sensors that pass illumination, whether visible or otherwise, through the gas stream, commonly referred to as nephelometers; acoustical sensors that measure the conduction of sound waves through the gas; radiation sensors that monitor the attenuation of alpha, beta or gamma particles passing through the gas stream; or ones of various mass sensors. Nephelometers are affected by the particle sizes and shapes within the gas stream, as well as the content of the gas stream, temperature and the history of the device, including potential optical blocking or interference due to accumulations of soot or other particulates within the gas stream. Consequently, these devices tend to be relatively inaccurate over time, or highly complex requiring significant maintenance. Acoustical sensors suffer from the same issues including particle size with the gas stream, chemical content of the gas stream, temperature, and particulate composition, though they tend to avoid the adverse impact of soot accumulation. Radiation sensors suffer from negative publicity in terms of radioactive contaminants, and the encumbrances associated with operation, storage and disposal of used radiation sources and radiation-exposed materials.

In view of the various limitations of the other devices, mass sensing devices have proven to be most practical for many diverse particulate measuring applications. These devices provide direct measurement of the mass of the particulates, which is a distinct advantage over the other sensing techniques outlined herein above. The basic principle behind these devices is that a mechanical system having mass in combination with a mechanical energy storage device will oscillate harmonically at a particular rate, referred to as the natural resonance frequency. This frequency is related to the system stiffness and mass. As the mass increases, such as when particles in a stream are collected, the natural resonance frequency decreases. The decrease in frequency is directly proportional to the increase in system mass. Consequently, and quite desirably, mass sensing devices have much simplicity to offer in the marketplace. Among the mass sensing devices are those gravitational sensors that provide for particle collection and weighing upon a surface parallel to the ground, wherein the collected particulate will be weighed based upon the natural force of gravity applied directly to the mass. Unfortunately, these sensors are sensitive to the direction of orientation of the sensor, and are generally also quite sensitive to shock or vibration generated externally from the sensor but coupled therewith. These sensors also do not typically have a good method for trapping or retaining particulates.

A more preferred method of sensing particulates is described as inertial sensing. Inertial sensors are designed to mechanically oscillate at a particular frequency. The addition of mass changes the natural resonance frequency of the sensor, just as with mass sensors described above, and so the frequency change can be used to directly measure the actual mass of a sample material. Among these types of sensors are oscillating fiber microbalances, where mass determination is made by monitoring the frequency change of a fiber clamped at one end and caused to oscillate with and without a mass load on the free end. These sensors tend to be fragile and susceptible to vibration or shock in the field.

Tapered Element Oscillating Microbalances (TEOM) use a tapered rod or element that oscillates at a unique frequency based upon mass loading. This technique, which has experienced particular success in the marketplace, typically incorporates a piezoelectric oscillator formed into a custom frusto-conical geometry having a horizontal cross-section which is elliptical. One example of a TEOM sensor is illustrated by Patashnick in U.S. Pat. No. 3,926,271 and Patashnick et al in U.S. Pat. No. 4,391,338, the teachings of which are each incorporated herein by reference. These patents disclose a hollow, tapered quartz tube of elliptical cross-section, and the more recent of the two patents further discloses a particulate filter through which a gas may be passed for particle entrapment. However, the particulate filters that are disclosed therein require manual filter replacement at the end of each sampling cycle. Furthermore, this complex quartz geometry must be custom manufactured at much cost. The sensing element tends to be fragile and easily damaged, as well as sensitive to mounting arrangements that might couple through to the oscillation mode of the quartz crystal, in a phenomenon referred to as coupled mode oscillation or interference. While the elliptical design reduces the tendency for coupled-mode oscillation, it does not eliminate this tendency. Consequently, more recent patents assigned to the same assignee, such as U.S. Pat. No. 5,488,203 illustrate methods of suspending the TEOM element, in an attempt to decouple the element from a supporting surface. This susceptibility is particularly consequential where there is substantial background vibration, such as where there is blasting, operation of heavy machinery and in other similar situations.

Another type of inertial sensor is the Quartz Crystal Microbalance (QCM) which changes in oscillation frequency depending upon mass-loading upon a collecting surface of the crystal or an attachment affixed to the crystal. Unfortunately, particularly in a moving gas stream, particles do not readily drop or settle onto the collecting surface. Furthermore, when a collecting surface has been used, the collecting surface must be removed from the gas stream and cleaned or replaced before further measuring is possible. These devices are further limited to a very small amount of mass that may be loaded upon a collector surface.

Yet another inertial sensor is an oscillating wire or ribbon sensor. The wire or ribbon is clamped on both ends and then loaded with particulate from the gas stream intermediate the ends. Much like the QCM, the collecting surface is not readily used for continuous sampling, nor is there any certainty that the particulates have adhered to the ribbon or wire. While these prior art techniques each offer certain benefit and so have proven effective in particular applications, there still exists a need for an improved gas particulate sensor. The prior art fails to beneficially address the needs of the industrial environment. What is needed then is a more robust sensor which is capable of exposure to a wider variety of gas streams and which is relatively insensitive to adverse affects of industrial environments, such as temperature, vibration and shock that have proven particularly troublesome in the prior art.

SUMMARY OF THE INVENTION

In a first manifestation, the invention is an apparatus for measuring particulate content suspended in a fluid medium. The apparatus is simultaneously durable and also insensitive to externally applied mechanical shock and vibration, and is further chemically resistant and suitable for automated sensing and measuring. A mounting block serves as a central support for other components. A filter permits fluid to pass through but prevents particulates of a minimum size from passing through. A means is provided for causing fluid with suspended particulates to pass through the filter in a first direction. A magnetostrictive support extends between the filter and mounting block and defines a longitudinal axis therebetween. A means is provided to magnetically excite the magnetostrictive support to generate mechanical oscillations therein, but only along the longitudinal axis. Finally, a means is provided for detecting a frequency of mechanical oscillations, whereby the frequency is directly proportional to a mass of suspended particulates constrained by the filter.

In a second manifestation, the invention is a method for weighing particulates suspended in a gas stream. The first step of the method is applying an electromagnetic field to a magnetostrictive material to generate oscillations in the material. The magnetostrictive material is connected to a particulate filter. The next step is determining an unloaded frequency of resonant oscillation. The gas stream will then be propelled through the filter in a first direction, to separate particulates from the gas stream and retain them mechanically coupled to the filter by aerodynamic drag. Next, a loaded frequency of resonant oscillation is measured. Then comes the step of generating a frequency difference between loaded frequency of resonant oscillation and unloaded frequency of resonant oscillation. After that, the mass is calculated for the separated suspended particulates based upon the generated frequency difference.

In a third manifestation, the invention is an apparatus for weighing particulates in a gas stream. A generally cylindrical tube is manufactured from a magnetostrictive material to have a first end anchored to a mounting block, a second end longitudinally opposite the first end and a passageway extending between the first end and the second end for conducting the gas stream therebetween. A filter adjacent the second end has pathways therethrough that are smaller than a diameter of the particulates. A conduit couples the gas stream to filter and passageway. An electromagnetic drive coil is magnetically coupled to the tube between each end. An electronic control circuit provides an electrical current to the electromagnetic drive coil to generate alternating magnetic fields in the generally cylindrical tube. An electromagnetic pick-up coil is also magnetically coupled to the tube between the tube ends for sensing a frequency of oscillation of the tube.

OBJECTS OF THE INVENTION

A first object of the invention is to provide a durable mass sensing apparatus that can withstand abuse, temperature extremes and extreme vibration. A second object of the invention is to provide a sensor which is relatively simple to drive electrically and which is relatively insensitive to external electromagnetic interference. A third object of the invention is to use aerodynamic drag to selectively retain particulates to or remove them from a filter for automated and repetitive mass sensing. Another object of the invention is to provide a mass sensor which oscillates in only a single mode, thereby rendering the oscillator insensitive to coupled mode interference. Yet another object of the invention is to provide a sensor capable of measuring widely varying ranges of particulate concentrations. An additional object of the invention is to provide diverse filter media that optimizes the sensor for particular environments or applications. These and other objects are achieved in the present invention, which may be best understood by the following detailed description and drawing of the preferred embodiment.

BRIEF DESCRIPTION OF THE DRAWINGS

FIG. 3 illustrates a first alternative embodiment filter arrangement by cross-section, while

DESCRIPTION OF THE PREFERRED EMBODIMENT

Figure 1:
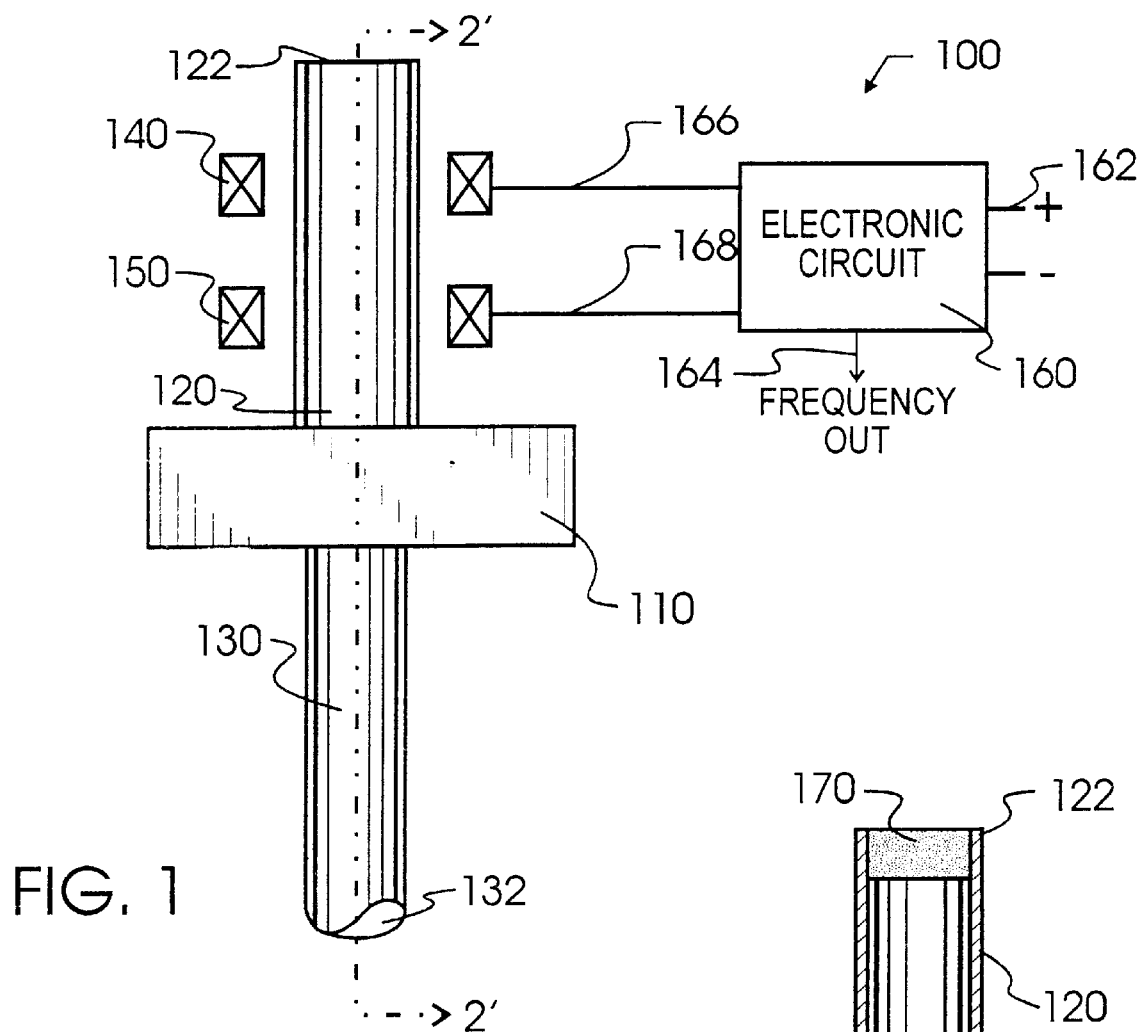
FIG. 1 illustrates by side view with partial schematic the major components of a preferred embodiment magnetostrictive sensor that has been designed in accord with the teachings of the invention.
Figure 2:
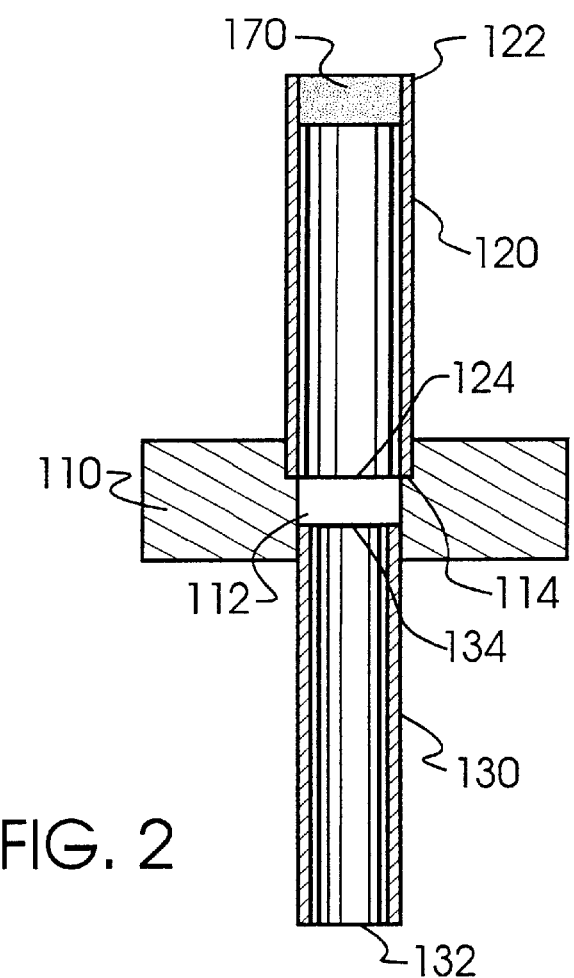
FIG. 2 illustrates the preferred embodiment mechanical components of FIG. 1 by cross-section along line 2', illustrating the interrelation of these components and further illustrating a preferred embodiment filter.

A preferred embodiment magnetostrictive mass sensing apparatus 100 is illustrated in FIGS. 1 and 2. A mounting block 110 serves as a supporting structure for the primarily mechanical components of apparatus 100. The exact composition and geometry of block 110 is not critical to the invention, and so block 110 is shown generically as a rectangular block. It will be understood to those in the art that various mounting holes, tabs or other means for attachment may be provided as known in the art to permanently mount block 110 and other components supported thereon to a larger package or housing. The larger package or housing would typically surround entire mass sensing apparatus 100, as is well known in the industry. The composition of mounting block 10 likewise is not critical. However, the composition will most preferably be compatible with magnetostrictive cylindrical tube 120, such that coefficients of thermal expansion and corrosion issues between potentially dissimilar metals are not overlooked. Most desirably, block 110 will have a small step 114 formed therein to accommodate the wall thickness of tube 120, such that the inside diameter of tube 120 matches the inside diameter of the balance of hole 112 formed in block 110. The internal diameters are not critical to the invention. However, it is very desirable to support tube 120 a predetermined distance within block 110, since the actual length of tube 120 is consequential to the performance of mass sensing apparatus 100, as will be described in greater detail hereinbelow. Extending away from block 110 in an opposite direction from tube 120 is an air conduit 130, having an outlet 132 and an internal end 134. Outlet 132 will most preferably be attached to an air pump or blower under the control of electronic circuit 160, to be discussed hereinafter. Tube 130 will most typically be rigidly anchored or even permanently affixed within block 110, though the exact positioning of tube 130 therein is not critical to the operation of the invention. Consequently, no step feature similar to step 114 has been provided, to reduce manufacturing costs.

As aforementioned, tube 120 is a particular composition known in the metal arts as a magnetostrictive metal or alloy. These are metals and alloys that, when exposed to a magnetic field, change shape in accordance with the orientation and strength of the magnetic field. Tube 120 may be reasonably selected from any of the metals and alloys known to possess this characteristic, though several compositions have been deemed to be most preferred. Nickel is one metal possessing the magnetostrictive characteristic. In addition to the desirable constriction when exposed to a magnetic field, nickel is also commonly used as a barrier metal or anti-corrosion plating in many different industries. Consequently, nickel has excellent corrosion resistance to a wide range of compositions that are corrosive to more base metals such as iron. Furthermore, nickel will readily alloy with, weld to or braze with iron-based alloys, allowing tube 120 to be readily attached to block 110 using ordinary assembly techniques. Another magnetostrictive alloy which is felt to offer better performance over wide temperatures is sold under the trademark Ni-Span-C, a mark of the former INCO or International Nickel Company, which is now owned by Special Metals Corporation of New Hartford, N.Y. This alloy consists of approximately 42% nickel, 5.4% chromium, 2.4% titanium, 48.5% iron, 0.65% aluminum, and various trace elements. Ni-Span-C also offers good working characteristics and corrosion resistance, and, as aforementioned, slightly better magnetostrictive characteristic over temperature.

Tube 120 will most preferably be fabricated with as thin a wall thickness as is reasonably possible, while still ensuring structural integrity and working. This thickness might desirably be in the five to ten one-thousandths of an inch range, or between 125 and 250 micrometers. Thinner wall thickness tends to have greater sensitivity, and so is more preferred where structural limitations are not exceeded. Additionally, greater sensitivity is attainable with greater distances between the particulate filter, such as filter 170 of FIG. 2, and block 110. Once again, this length will be limited by practical considerations such as the final package size and cost for apparatus 100, and structural integrity, where excessive shocks will more adversely affect a body such as tube 120 as the length of tube 120 increases. Noteworthy here is the fact that, even when tube 120 is extremely thin, it still will generally have much greater structural integrity than prior art quartz crystals.

In the most preferred embodiment of FIGS. 1 and 2, the magnetostrictive mass sensing apparatus 100 includes a microporous filter 170. Most preferably, this microporous filter 170 will be manufactured from sintered metal, which preserves small pathways that extend completely through the body of filter 170. While filter 170 may be designed readily to include other attachment methods, the use of a simple press-fit will be adequate to retain filter 170 in place within tube 120 while also preserving the opportunity for future replacement. Other methods of attachment are contemplated as known in the art of metal fabrication and fastening, including various threaded fasteners, snap-fit couplers, and even brazing and the like. However, a non-permanent or semi-permanent connection will be most desirable, since, over time, filter 170 may need to be replaced. Other materials have also been contemplated for filter 170, and include microporous sintered ceramic compositions, and hydrophobic microporous polymers manufactured from materials such as Teflon, polyethylene and polypropylene. Other materials may later be deemed to be appropriate for a particular application or gas stream, including such materials as polyimides, polyamides, polyesters, polyurethanes, acrylics and other materials. The advantage of selecting a hydrophobic polymer is derived from the potential for water absorption by hydrophilic polymers, and the uncertainty of the final use for the sensor.

Electronic circuit 160 is only illustrated schematically by block diagram, as are drive coil 140 and sense coil 150. The art of magnetostrictive drive circuits is well established, and notice is taken herein for the teachings of more exact electronics which might be selected as most preferred in association with the present invention. Typically, electronic circuit 160 will be designed to drive a coil through line 166, suggesting the ability to drive a relatively large current through drive coil 140. One of the benefits of this type of drive over the electrostatic drives used, for example, in quartz crystal sensors, is a much greater tolerance for Electromagnetic Interference (EMI) in the preferred embodiment. Various additional lines will be provided, including a sense coil 150 input through line 168, and a frequency output through line 164. As will be apparent, the exact arrangement or type of components comprising the electronic circuit 160 is not critical to the present invention, and the schematic illustration in the drawing figure is provided merely as a guide to assist those skilled in the art in the practice of the present invention, as required by the statutes.

Figure 3:
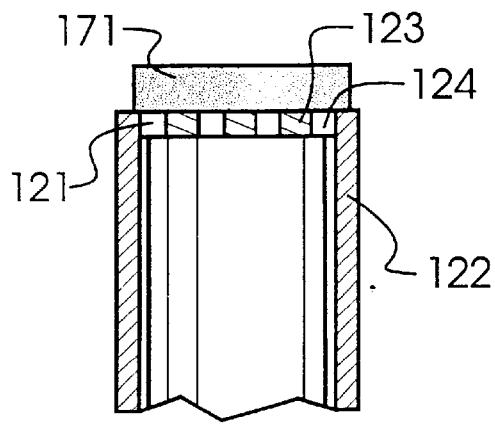
Figure 4:
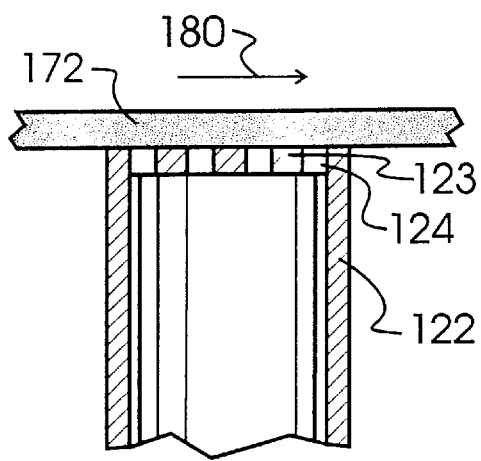
FIGS. 4 and 5 illustrate second and third alternative embodiment filters by cross-section.
Figure 5:
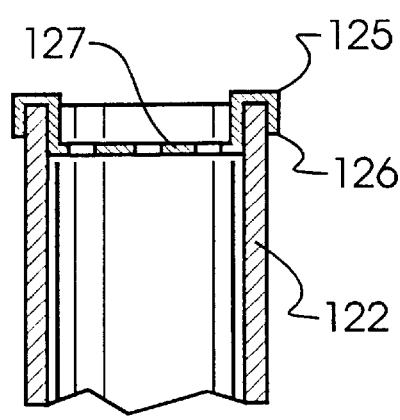

FIGS. 3–5 illustrate alternative particulate filter arrangements that are contemplated for use with the preferred embodiment magnetostrictive mass sensing apparatus 100. Magnetostrictive tube end 122 is visible in each of the illustrated alternatives. FIGS. 3 and 4 each illustrate a filter support disk 123 having relatively large openings 124 therethrough, through which a gas stream may readily pass relatively unobstructed. Filter support disk 123 may be a simple screen of glass fiber, Teflon fiber or other similar material, or may be simply a perforated plate or disk. This disk may be permanently attached, such as by permanent adhesive, semi-permanent adhesive, welding, brazing or other suitable technique. A microporous filter 171 is illustrated adjacent disk 123, and will most preferably be adhered thereto or otherwise retained. Nevertheless, filter 171 should be replaceable as required. Microporous filter 172 is illustrated in FIG. 4 as being an indeterminate length filter, typically as might be found in the form of a roll or belt. Arrow 180 illustrates a direction of travel for filter 172, indicating that filter 172 may be moved for continuous sampling applications of long term duration. Another alternative filter support 125 is illustrated in FIG. 5, with the filter such as filter 171 removed for clarity. As shown in FIG. 5, filter support 125 has a flange 126 which press-fit engages with tube 120 at tube end 122, and also has a small cup or filter receiving portion 127. This filter support 125 is attachable and removable without the necessity for adhesives.

Figure 6:
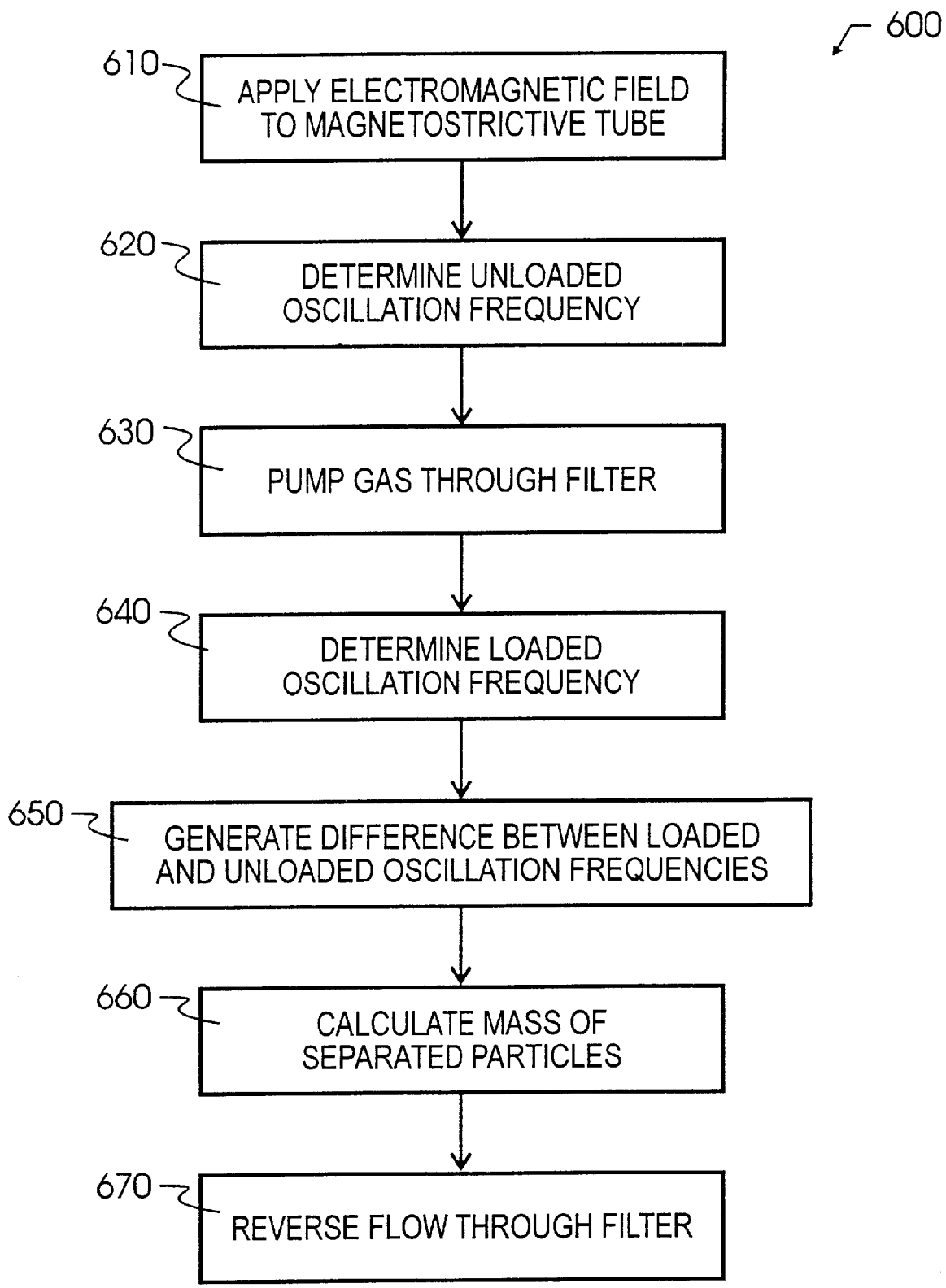
FIG. 6 illustrates the preferred embodiment method for calculating particulate levels of a gas stream.

FIG. 6 illustrates the preferred embodiment method 600 for calculating particulate levels of a gas stream. At step 610, an electromagnetic field is applied to the magnetostrictive tube. Next, in step 620, the unloaded oscillation frequency is determined, which is the frequency of oscillation prior to the addition of any gas particulate mass. In step 630, the gas stream is pumped through the filter, thereby separating particulates out of the gas stream and leaving them in contact with the filter material. Furthermore, due to the flow of gas through the filter, particles of all sizes will be pulled against the filter by the aerodynamic drag of the particles against the flow of the gas stream. This helps to overcome the limitations of some of the alternative prior art, where in those cases it was difficult to ensure good physical contact between the particulates and the sensing surface. After the appropriate time interval, the loaded oscillation frequency is determined at step 640. This information will be processed by electronic circuit 160 in step 650 to generate a difference between the loaded and unloaded oscillation frequencies. Electronic circuit 160 will then calculate the mass of the particulates that were separated from the gas stream by the filter in step 660. Finally, in step 670, the flow through the filter will be reversed, separating the particulates from the filter and returning them to the gas stream. This step 670, combined with the novel filter media of the preferred embodiment, is significant since the particulates will not permanently contaminate the filter media. In other words, in automated sampling equipment, the filter media will be refreshed at the end of each sampling cycle, and be ready for immediate re-use without replacement. Furthermore, for those applications requiring very extended automated testing, filter 172 may be used to allow the feed of new filter material at regular intervals. The already used filter material 172 has been blown reasonably clean at each step 670, thereby allowing nearly indefinite operation of an automated sampling site.

Having thus disclosed the preferred embodiment and some alternatives to the preferred embodiment, additional possibilities and applications will become apparent to those skilled in the art without undue effort or experimentation. Therefore, while the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

What is claimed is:

1. An apparatus for measuring particulate content suspended in a fluid medium which is simultaneously durable and also insensitive to externally applied mechanical shock and vibration, and which is further chemically resistant and suitable for automated sensing and measuring, comprising:
   a mounting block;
   a filter through which said fluid will pass but which will prevent particulates of a minimum size from passing therethrough;
   a means for causing said fluid containing said suspended particulates to pass through said filter in a first direction;
   a magnetostrictive support extending between said filter and said mounting block and defining a first longitudinal axis therebetween, said magnetostrictive support suspending said filter in said fluid;
   a means for magnetic excitation of said magnetostrictive support to generate mechanical oscillations in said magnetostrictive support only along said first longitudinal axis; and
   a means for detecting a frequency of said mechanical oscillations;
   whereby said frequency is directly proportional to a mass of said suspended particulates constrained by said filter from passing therethrough.

2. The apparatus for measuring particulate content suspended in a fluid medium of claim 1, further comprising a means for calculating said mass of said suspended particulates constrained by said filter from passing therethrough.

3. The apparatus for measuring particulate content suspended in a fluid medium of claim 1, wherein said magnetostrictive support further comprises a conduit for retaining said fluid in a defined passageway adjacent a first side of said filter.

4. The apparatus for measuring particulate content suspended in a fluid medium of claim 1, wherein said fluid is gaseous.

5. The apparatus for measuring particulate content suspended in a fluid medium of claim 1, wherein said magnetostrictive support is a tubular metal structure.

6. The apparatus for measuring particulate content suspended in a fluid medium of claim 5, wherein said magnetostrictive support is composed of nickel.

7. The apparatus for measuring particulate content suspended in a fluid medium of claim 5, wherein said magnetostrictive support is composed of Ni-Span-C.

8. The apparatus for measuring particulate content suspended in a fluid medium of claim 1, wherein said filter is comprised by a microporous material.

9. The apparatus for measuring particulate content suspended in a fluid medium of claim 8, wherein said filter is comprised by a sintered metal.

10. The apparatus for measuring particulate content suspended in a fluid medium of claim 8, wherein said filter is comprised by a microporous ceramic.

11. The apparatus for measuring particulate content suspended in a fluid medium of claim 8, wherein said filter is comprised by a hydrophobic material.

12. The apparatus for measuring particulate content suspended in a fluid medium of claim 1, further comprising a filter disk for supporting said filter having a means for removably attaching said filter disk co-operatively to said magnetostrictive support, whereby said filter disk may be non-destructively removed from said magnetostrictive support.

13. The apparatus for measuring particulate content suspended in a fluid medium of claim 8, wherein said filter is comprised by an indeterminate length tape which is moved transversely to said magnetostrictive support.

14. The apparatus for measuring particulate content suspended in a fluid medium of claim 8, further comprising a reversible fluid conveyor for drawing said fluid through said filter in a first flow direction and, when reversed, drawing said fluid through said filter in a second flow direction opposite to said first flow direction, whereby said suspended particulates are flushed from said filter during said second flow direction.

15. A method for weighing particulates suspended in a gas stream, comprising the steps of:

applying an electromagnetic field to an elongate magnetostrictive material to thereby generate oscillations longitudinally therein, said magnetostrictive material anchored at a first longitudinal end and suspending a filter longitudinally distal to said first end;

determining an unloaded frequency of resonant oscillation of said magnetostrictive material and said suspended filter;

propelling said gas stream through said filter in a first direction, whereby said suspended particulates are separated from said gas stream and retained mechanically coupled to said filter by aerodynamic drag with said propelled gas stream;

measuring a loaded frequency of resonant oscillation of said magnetostrictive material and said suspended filter;

generating a frequency difference between said loaded frequency of resonant oscillation and said unloaded frequency of resonant oscillation; and calculating a mass of said separated suspended particulates based upon said generated frequency difference.

16. The method for weighing particulates suspended in a gas stream of claim 15, further comprising the additional step of changing said gas stream flow through said filter from said first direction to a second direction to separate said retained mechanically coupled suspended particulates from said filter.

17. The method for weighing particulates suspended in a gas stream of claim 16, wherein said second direction is opposite said first direction.

18. An apparatus for weighing particulates in a gas stream, comprising:

a generally cylindrical tube manufactured from a magnetostrictive material having a first end anchored to a mounting block, a second end longitudinally opposite said first end and a passageway extending from said first end to said second end for conducting said gas stream therebetween;

a filter adjacent said second end having pathways therethrough that are smaller than a diameter of said particulates;

a conduit for coupling said gas stream to said filter and said passageway;

an electromagnetic drive coil magnetically coupled to said generally cylindrical tube between said first end and said second end;

an electronic control circuit to provide an electrical current to said electromagnetic drive coil to generate alternating magnetic fields in said generally cylindrical tube; and an electromagnetic pick-up coil magnetically coupled to said generally cylindrical tube between said first end and said second end for sensing a frequency of oscillation of said generally cylindrical tube.

19. The apparatus for weighing particulates in a gas stream of claim 18, further comprising a reversible gas pump for propelling said gas stream through said filter and said passageway to said first end in a forward propulsion mode and for propelling said gas stream from said first end through said filter in a reverse propulsion mode, whereby said particulates may be alternately adhered to said filter and removed therefrom.

20. The apparatus for weighing particulates in a gas stream of claim 19, wherein said electronic control circuit receives a first frequency of oscillation from said electromagnetic pick-up coil when a first subset of said particulates are removed from said filter by said reverse propulsion mode, receives a second frequency of oscillation from said electromagnetic pick-up coil when a second subset of said particulates are adhered to said filter by said forward propulsion mode, and further calculates a mass of said second subset of said particulates responsive to said first frequency of oscillation and said second frequency of oscillation.

* * * * *